(12) United States Patent
Burlingame (10) Patent No.: US 7,843,582 B2
(45) Date of Patent: *Nov. 30, 2010

(54) SYSTEMS AND METHODS FOR DRIVERLESS N-UP AND DUPLEXED IMAGING

(75) Inventor: John J. Burlingame, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1111 days.

This patent is subject to a terminal disclaimer.

(21) Appl. No.: 11/216,891

(22) Filed: Aug. 31, 2005

(65) Prior Publication Data

US 2007/0052979 A1    Mar. 8, 2007

(51) Int. Cl.
G06F 15/00 (2006.01)
G06F 3/12 (2006.01)
G06K 1/00 (2006.01)
G06K 15/00 (2006.01)

(52) U.S. Cl. .................. 358/1.15; 358/1.18
(58) Field of Classification Search ............ 358/1.1–1.9
See application file for complete search history.

(56) References Cited

U.S. PATENT DOCUMENTS

| | | | |
|---|---|---|---|
| 6,147,742 A * | 11/2000 | Bell et al. ............... | 355/27 |
| 7,038,714 B1 * | 5/2006 | Parulski et al. .......... | 348/207.2 |
| 2002/0051200 A1 * | 5/2002 | Chang et al. ............ | 358/1.15 |
| 2002/0052897 A1 * | 5/2002 | Nishikawa et al. ...... | 707/527 |
| 2002/0138564 A1 | 9/2002 | Treptow et al. | |
| 2003/0227639 A1 | 12/2003 | Ferlitsch | |
| 2004/0130741 A1 | 7/2004 | Ferlitsch | |

FOREIGN PATENT DOCUMENTS

| JP | 10-228362 | 8/1998 |
|---|---|---|
| JP | 2000-035865 | 2/2000 |
| JP | 2002-029100 | 1/2002 |
| JP | 2004-090612 | 3/2004 |

* cited by examiner

*Primary Examiner*—Douglas Q Tran
(74) *Attorney, Agent, or Firm*—Austin Rapp & Hardman (57) ABSTRACT

Image data comprising multiple images is received at an imaging device. The image data does not need to be processed by a driver before it is received at the imaging device. A number of images to be included in an output group is determined. Image data for each of the images to be included in the output group is identified. The image data for images within the output group is transformed into an image-ready format to be imaged within an N-up grid. The transformed image data for each of the images within the output group is stored in a buffer at a memory location corresponding to a cell within the N-up grid to form at least one rendered page. One of the rendered pages having image data formatted in an N-up grid is transmitted to the marking engine for imaging.

18 Claims, 10 Drawing Sheets

SYSTEMS AND METHODS FOR DRIVERLESS N-UP AND DUPLEXED IMAGING

TECHNICAL FIELD

The present invention relates generally to computers and computer-related technology. More specifically, the present invention relates to systems and methods for creating images in N-up and/or duplexed format without the need for preprocessing of image data by a driver.

BACKGROUND

Imaging devices are frequently used in many aspects of business, industry, and academic endeavors. The term "imaging," as used herein, should be interpreted broadly to include any process for producing a copy of a document onto paper, a computer screen, an electronic image, or the like. Examples of imaging devices include printers, facsimile devices, copiers, scanners, display monitors, multi-function peripherals (MFPs), imagesetters, platesetters, filing devices, web publishing devices, and so forth. Documents that are sent to a printing device for printing are sometimes referred to as "print jobs."

Printers (one kind of imaging device) are used with computers to print various kinds of items, including letters, documents, pictures, etc. Many different kinds of printers are commercially available. Ink jet printers and laser printers are common among computer users. Ink jet printers propel droplets of ink directly onto the paper. Laser printers use a laser to print. Many imaging devices can generate scanned image data. For example, some imaging devices include scanners, which can scan a document to provide scanned image data. It is also possible that an imaging device will be able to read scanned image data from a storage device. There may also be other ways in which an imaging device may be provided with or otherwise obtain scanned image data. Copiers and facsimile devices are also commonly used imaging devices.

Current imaging systems, unfortunately, suffer from a number of limitations. For example, some individuals who would like to create an image, such as a photographic image, from image data either do not have a computer system to do so or do not have the skill set to load digital images on to a computer system and print them. These users, instead, are limited, for example, to viewing images on a digital camera screen or sending the images to a commercial printing service.

In addition, an individual may wish to image a plurality of images on a single sheet of imaging medium (e.g., photographic paper) to "preview" the images. Frequently, an individual may wish to do so without taking the time to load all the images onto a computer system and format the images for printing, even if a computer system is available to do so.

Accordingly, benefits may be realized by improved systems and methods for imaging multiple images on a single sheet of imaging medium without the need for separate processing of the images by a driver residing on a computer system. Some exemplary systems and methods for imaging multiple images on a single sheet are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

A method for creating an image in an N-up format in a driverless environment is disclosed. Image data comprising multiple images is received at an embedded imaging device. The received image data has not been transformed into an N-up grid by an imaging driver. A number of images to be included in an output group is determined. The output group comprises image data for the number of images to be stored before imaging is initiated. Image data for each of the images within the output group is identified. Image data for each of the images within the output group is transformed into an image-ready format to be imaged within an N-up grid. The transformed image data for each of the images within the output group is stored in a buffer at a memory location corresponding to a cell within the N-up grid to form at least one rendered page. One of the rendered pages having image data formatted in an N-up grid is transmitted to a marking engine for imaging.

In one embodiment, the image data does not need to be processed by a driver before processing by the embedded imaging device. In such an embodiment, the image data may be, for example, provided to the embedded imaging device by a portable storage device in electronic communication with the imaging device.

The output group may comprise N images. N is the number of images to be included within the N-up grid. In one configuration, there is no restriction on the size of N.

In one embodiment, the format of the N-up grid is determined. Thereafter or concurrent therewith, the dimensions of each cell may be determined based on the format of the N-up grid and dimensions of the target imaging medium (e.g., a sheet of paper).

In one configuration, the number of images within the output group is controlled by N-up and duplexing settings for the embedded imaging device.

The imaging device may be capable of producing duplexed output. In such an embodiment, transmitting may comprise transmitting at least a first and second rendered page in an N-up format for duplexed imaging of the first and second rendered pages by the marking engine.

When the duplex mode is set to back-page-first, the number of images within the output group is 2N, where N is the number of images to be included within the N-up grid on one side of an imaging medium.

An imaging device configured to implement the methods described above is also disclosed. The imaging device includes a processor, and memory and a marking engine in electronic communication with the processor. Instructions are stored in the memory to implement the methods described above. In one embodiment, the imaging device is a printing device.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

Figure 1:
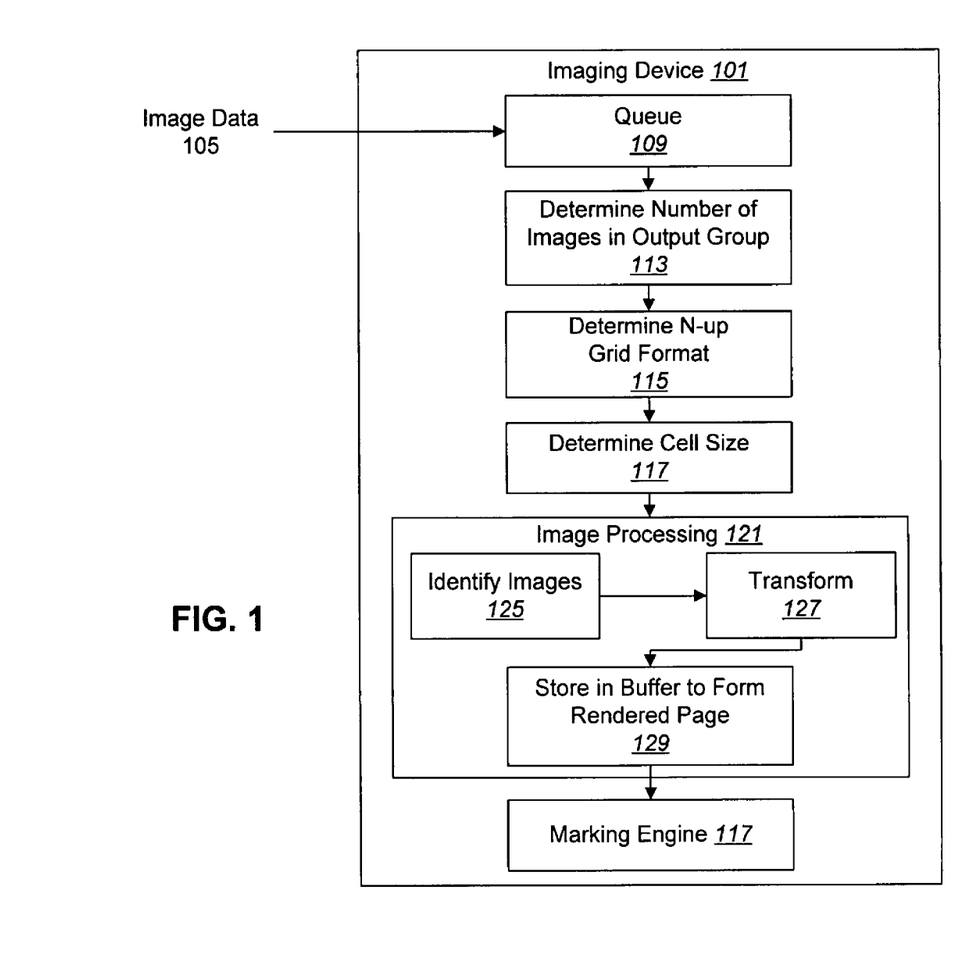
FIG. 1 is a block diagram illustrating one embodiment of an imaging device for creating an image using image data comprising multiple images.

FIG. 1 is a block diagram illustrating one embodiment of an imaging device 101 for creating an image using image data 105 comprising multiple images. Imaging devices 101 may be embodied in a wide variety of configurations. For example, imaging devices 101 include printers, facsimile devices, copiers, scanners, display monitors, multi-function peripherals (MFPs), imagesetters, platesetters, filing devices, web publishing devices, and so forth.

As indicated in FIG. 1, the imaging device 101 receives image data 105. Image data 105 is any type of data or information that may be used directly or through a conversion process to produce an image. The image data 105 may be provided, in one embodiment, in a streaming, or sequential, manner. The image data 105 may be transmitted to or received by the imaging device 101 in a number of different ways. For example, the image data 105 may be produced by a computing device in the form of a print job and then transmitted to the imaging device 101. Alternatively, as another example, the image data 105 may be presented to the imaging device 101 through a portable flash memory storage device (e.g., a thumb drive) placed in communication with the imaging device 101. In any case, the image data 105 does not need to be processed by an imaging driver before it is received by the imaging device 101. Thus, the image data 105 may come in various formats and be delivered using a number of different techniques.

As indicated above image data 105 comprises multiple images. An "image" may be embodied in a number of different ways. For example, an image may be a separate file that has been concatenated with other image files to form the image data 105 (e.g., concatenated joint photographic experts group (JPEG) files). An image may also involve one of a number of separate image files sent to the imaging device 101. An image, if the imaging medium is a display screen, may be the portion of image data 105 that can be entirely displayed at a single time on the display screen. In another embodiment, each separate page within the multi-page image file comprises a separate image (e.g., tagged image file format (TIFF) images having multiple pages).

The image data 105 is received at a queue 109 within the imaging device 101. The queue 109 temporarily stores the image data 105 until it can be processed further by the imaging device 101. The queue 109 may further be used for spooling of image data 105. In an alternative embodiment, the imaging device 101 may include a queue 109 and a separate spooling device.

The queue 109 may comprise memory of different types, such as volatile and nonvolatile memory. In one embodiment, volatile memory (e.g., random access memory (RAM)) is used because of its rapid read/write speeds.

Thereafter, the number of images to be included in an output group is determined 113. An output group comprises the number of images that must be processed and stored before the processed image data is sent to the marking engine 117 for imaging. As will be explained in greater detail below, multiple images may be imaged to a single sheet of an imaging medium (e.g., a sheet of paper). Accordingly, before any imaging is initiated, one must determine how many images are to be placed on a sheet of an imaging medium.

A sheet of an imaging medium may be embodied in a variety of different ways. The sheet could include a piece of paper having two printable sides or, alternatively, a printing medium having only a single side that may be properly printed on, such as a coated piece of photo printing paper. Alternatively, a sheet could include a discrete image or grouping of images to be shown on a display device, often, but not always, having a common background color or theme.

In one implementation of the systems and methods disclosed herein, the number of images within the output group is controlled by duplexing and/or N-up settings for the imaging device 101. The duplexing and N-up settings may be established in a number of different ways. For example, the settings may be configured directly by a user at the imaging device 101 (such as by a touchpad or other input device) or may be established by control commands embedded or preceding within the image data 105.

Duplexing comes in two different varieties: front-page-first and back-page-first duplexing. Front-page-first duplexing involves imaging a page in a sequence of pages on one side of a pertinent imaging medium, and then imaging the next page in the sequence of pages on the other side of the imaging medium. Conversely, back-page-first duplexing involves imaging a page in a sequence of pages on one side of a pertinent imaging medium, and then imaging the prior page in the sequence of pages on the other side of the imaging medium.

N-up imaging involves imaging more than one image on a single side of a sheet of an imaging medium. The variable "N" in N-up image processing represents the number of images to be imaged on a single side of a sheet of the imaging medium. For example, using 4-up image processing, four images are imaged on to a single sheet by resizing each image and positioning the four images on the sheet. In one embodiment, the images may be imaged on a sheet in row(s) and column(s).

Figure 2A:
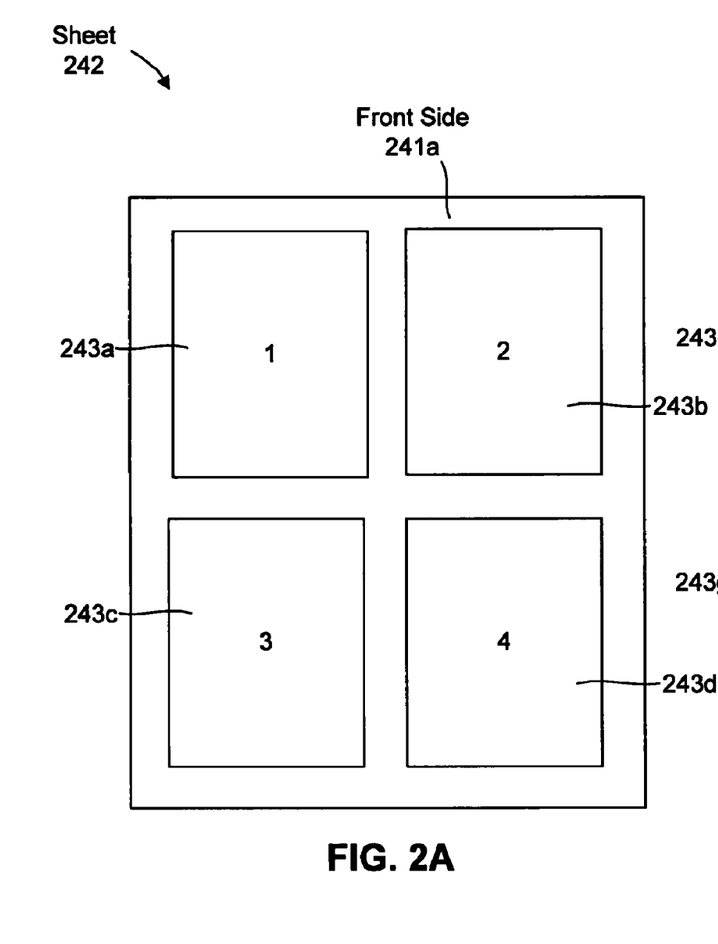
FIGS. 2A and 2B are diagrams illustrating the front and back sides, respectively, of a previously imaged sheet of imaging medium comprising images formatted in an N-up grid produced according to one embodiment of a disclosed imaging device.
Figure 2B:
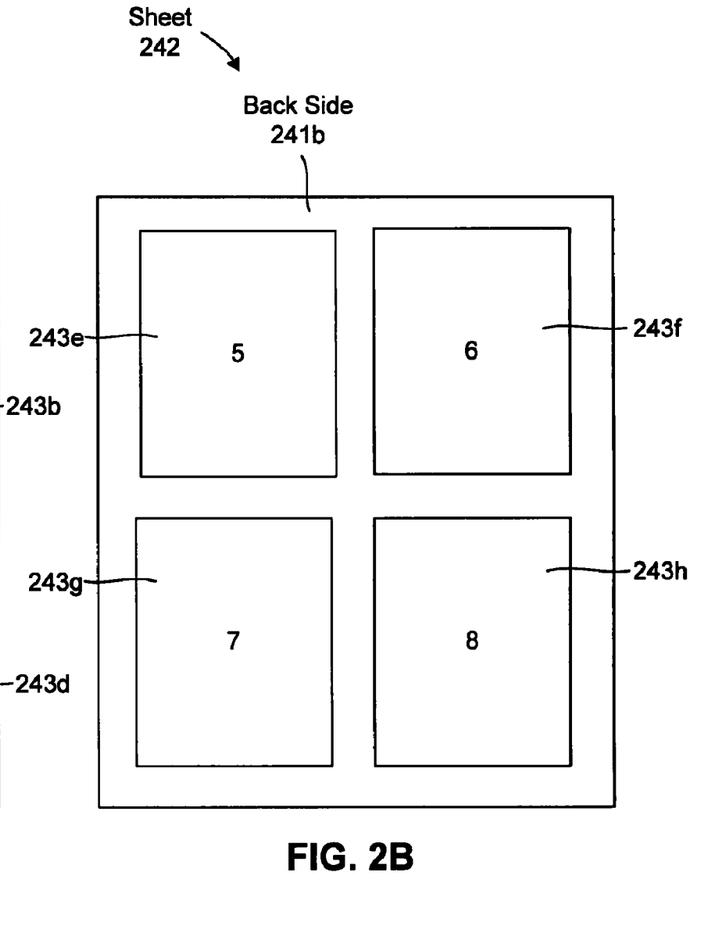
Figure 3:
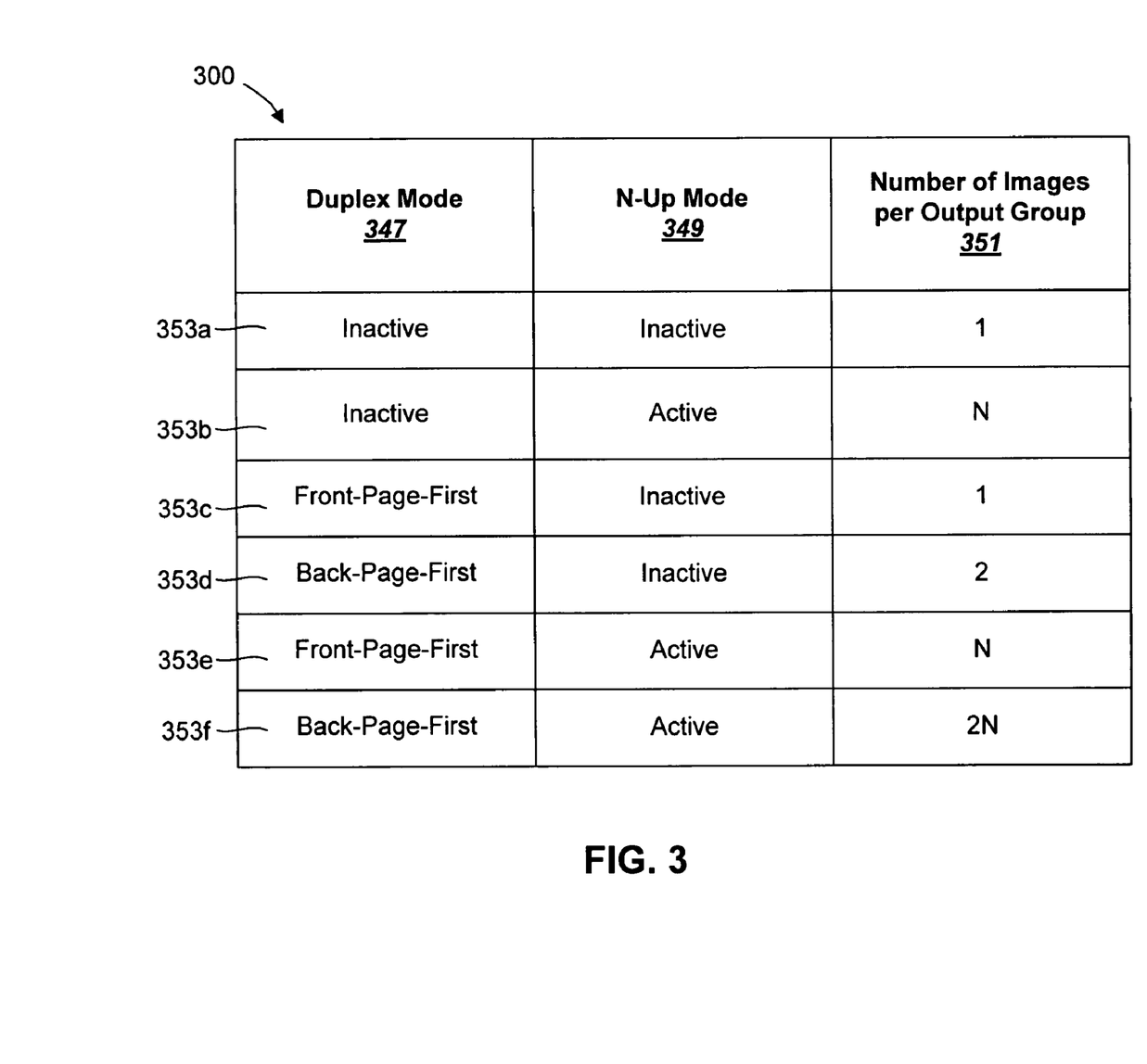
FIG. 3 is a table indicating the number of images within an output group according to one embodiment of the systems and methods disclosed herein.

Duplexing and N-up formats may be combined to produce an N-up, duplex format. Using this type of formatting, N images are printed on each side of a sheet. FIGS. 2A and 2B, which will be discussed in detail below, are diagrams illustrating the front and back sides of a sheet of imaging medium when duplexing is active and N-up is set to "4." FIG. 3 is a table that explains how to determine the number of images within the output group depending on the duplex and N-up settings and, again, this figure will be explained in further detail below.

Referring again to FIG. 1, concurrent with or following the determination 113 of the number of images in the output group, the format of an N-up grid is determined 115. The N-up grid, in one embodiment, comprises a series of rows and columns in which the images will be formatted. The grid could include a single row and multiple columns, a single column and multiple rows, or multiple rows and columns. Of course, alternative configurations of the grid are possible within the scope of the systems and methods disclosed herein. In one embodiment, there is no restriction or limitation on the number of images that may be imaged on a single side of a sheet of imaging medium within a grid.

Following a determination 115 of the format of the N-up grip, the dimensions of each cell within the grid may likewise be determined 117. These dimensions may be used to determine how to resize a particular image in the transformation process 127 discussed below and are based, for example, on the format of the grid and the dimensions of the target imaging medium (i.e., the medium on which imaging will occur).

Following these steps 113, 115, 117, page processing 121 begins. In one embodiment, image processing 121 involves three stages: (1) identifying 125 image data for each image; (2) transforming 127 image data for an image; and (3) storing 129 the transformed image data to a buffer. These three stages 125, 127, 129, in one embodiment, are performed for each image in the output group.

In one embodiment, identifying 125 image data corresponding to a particular image is performed by identifying image boundaries (i.e., a beginning and an ending boundary for each image) within streaming image data. Depending on the format of the image data 105, identifying 125 image boundaries may be performed a number of different ways, such as by identifying markers between each image or determining the location of an offset based on header information within image data. Two embodiments of techniques for identifying 125 image boundaries will be discussed in connection with FIGS. 4-5.

In one embodiment, images may be loaded into the imaging device 101 as separate files and thus each image may be identified 125 as a separate file. For example, images may be introduced to the imaging device 101 through placing the imaging device 101 in communication with a portable storage device (e.g., a thumb drive, compact disk, compact flash (CF) card). The imaging device 101 may thus identify separate images by individually loading each image, or selected images, from the portable storage device.

Transforming 127 the identified image data comprises reformatting the image data into an image-ready format (i.e., a format that may be directly processed and imaged by the marking engine 117) to be imaged within an N-up grid. In one embodiment, transforming 127 may include decompressing (if the image data is compressed), resizing (if necessary, for example, to fit in an N-up grid), color-space transforming, bit-depth transforming, and half-toning the image data. In one embodiment, these steps may be performed sequentially on sections or portions of the image data, rather than the entire image. One embodiment of the transformation process 127 will be discussed in further detail in connection with FIG. 7.

Following identification 125 of image data for each image and transformation 127 of image data for a particular image, the transformed image data is stored 129 in a buffer. The buffer may comprise memory of various types, such as volatile and nonvolatile memory.

The transformed image data is stored 129 in a buffer to form at least one rendered page that may be directly processed by the marking engine 117. In one embodiment, stored image data for a particular image is placed in a memory location corresponding to a cell within the N-up grid to form at least one rendered page configured to image the images in an N-up grid. As noted above, the stages 125, 127, 129 of image processing 121 may occur for each image in the output group.

After the transformed images are stored 129 in the buffer, one of the rendered pages is transmitted to the marking engine 117 for imaging. The imaging may thus be initiated without waiting for all the image data 105 to be received at the imaging device 101. In one embodiment, rendered pages may be transmitted to the marking engine for conventional, single-sided processing or duplexed processing by the marking engine 117.

Using the systems and methods disclosed above, images may be printed in an N-up format without the need for pre-processing the images by an imaging driver in a computer system. Accordingly, consumers may use the imaging device to obtain thumbnail images without the need to interact with a general purpose computing device and its attendant complexities.

FIG. 2A is a diagram illustrating the front side 241a of a previously imaged sheet 242 of imaging medium when duplexing is active and N-up is set to "4." FIG. 2B is a diagram of the back side 241b of the sheet 242. As illustrated, the images 243 have been reduced in size and imaged on the illustrated sheet 242, in rows and columns. For simplicity, graphical details of the images 243 are omitted from FIGS. 2A and 2B and only image boundaries are shown. Images 1-4 243a-d are positioned on the front side 241a of the sheet 242, while images 5-8 243e-h are positioned on the back side 241b of the sheet 242.

Of course, alternate configurations are possible within the scope of the systems and methods disclosed herein. In particular, the number of images imaged on the sheet 242 or the duplexing settings may be varied. For example, if the duplexing setting is inactive, images 1-4 243a-d would be imaged on the front side 241a of the sheet 242, and images 5-8 243e-h would be imaged on the front side of a second sheet. Alternatively, if the N-up setting is inactive and duplexing is active, image 1 243a would be displayed on the front side 241a of the sheet 242, while image 2 243b would be displayed on the back side 241b of the sheet 242. Spacing between each of the images 243 may also be altered from the spacing depicted in FIGS. 2A and 2B. In one embodiment, there is no space between the images 243 on a sheet 242.

FIG. 3 is a table 300 indicating the number of images within the output group according to one embodiment of the systems and methods disclosed herein. In the embodiment described in table 300, the duplexing settings 347 and N-up settings 349 control the number of images in the output group 351, i.e., the number of images to be stored before imaging is initiated. Of course, embodiments of the systems and methods disclosed herein, may involve, for example, only duplexing settings 347 or only N-up settings 349.

With respect to the first row 353a of the table 300, if duplexing and N-up are set to inactive, only one image will be stored before imaging is initiated. After being stored as a rendered page, the transformed image data for the image will be transmitted to the marking engine 117 for imaging on a single side of a single sheet of an imaging medium.

With respect to the second row 353b of the table 300, if the duplexing is set to inactive and N-up is active, a set of N images will be stored as a rendered page before imaging is initiated. In one embodiment, the set of N images are stored such that the image data will be formatted as a rendered page having rows and columns of images when imaged by the marking engine 117. Following storage of the last image of the set of N images, the set of N stored images will be transmitted to the marking engine 117 as a rendered page for imaging. Thereafter, each set of N images will be transformed and stored in the buffer as a rendered page, and then transmitted to the marking engine 117 for imaging in sequence.

With respect to the third row 353c of the table 300, if duplexing is set to front-page-first and N-up is set to inactive, only one image will be stored as a rendered page before image data is transmitted to the marking engine 117. The first image will be imaged on one side of a sheet of an imaging medium without waiting for the second image to be stored. After the first image has been imaged, the stored second image will be transmitted as a rendered page to the marking engine for imaging on the other side of the sheet.

With respect to the fourth row 353d of the table 300, if duplexing is set to back-page-first and the N-up setting is inactive, two images will be stored before imaging is initiated. A first image will be stored as a rendered page, and then a second image will be stored as a rendered page. Thereafter, the second stored page will be transmitted to the marking engine 117 and imaged on one side of a sheet. The first stored page will then be retrieved from the buffer and transmitted to the marking engine 117 for imaging on the other side of the sheet.

With respect to the fifth row 353e of the table 300, if duplexing is set to front-page-first and the N-up setting is active, a first set of N images will be stored before imaging is initiated. The first set of N images will be stored as a rendered page and transmitted for imaging on one side of a sheet. Thereafter, the next set of stored N images, which may be processed and stored while imaging of the first N images is occurring, will be transmitted as a rendered page to the marking engine 117 for imaging on the other side of the sheet.

With respect to the sixth row 353f of the table 300, if duplexing is set to back-page-first and the N-up setting is active, 2N images will be stored before imaging is initiated. The first set of N images will be stored as a rendered page. Thereafter, the second set of N images will be stored as a rendered page. The second set of N images will be transmitted as a rendered page to the marking engine 117 for imaging on one side of a sheet. Thereafter, the first set of N logical images will be transmitted as a rendered page to the marking engine 117 for imaging on the other side of the sheet.

Figure 4A:
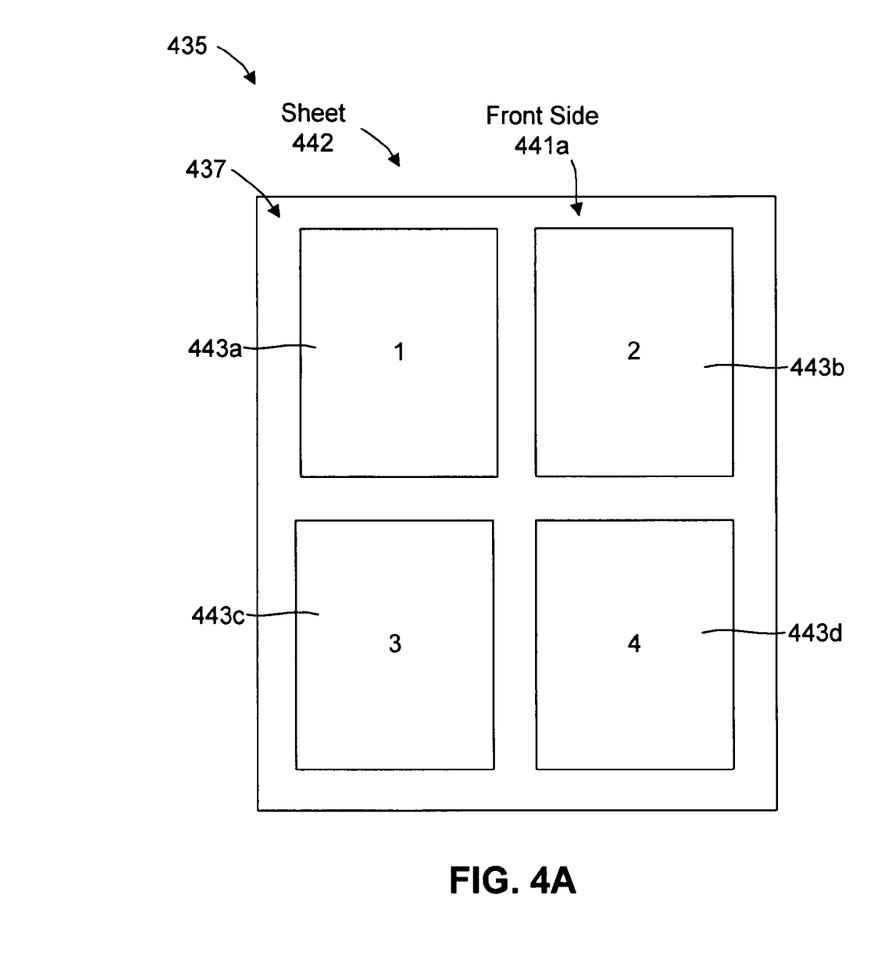
FIG. 4A is a diagram illustrating one embodiment of a sheet of imaging medium including images formatted in an N-up grid.

FIG. 4A is a diagram illustrating one embodiment of output 435 of a rendered page having image data formatted into an N-up grid 437. In particular, FIG. 4A depicts the front side 441a of the sheet 442 of imaging medium having four images 443a-d imaged on the sheet 442 in a 4-up grid 437. As with FIGS. 2A and 2B, for simplicity, only image boundaries of the images 443a-d are depicted.

Figure 4B:
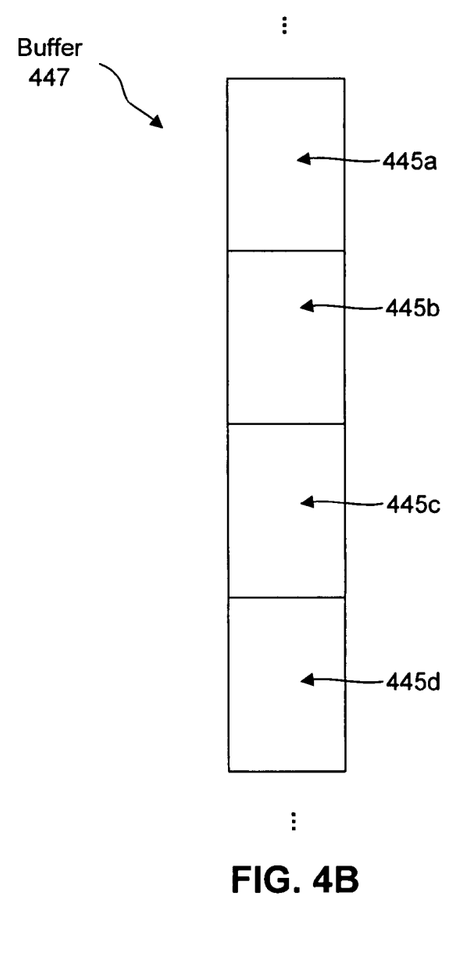
FIG. 4B is a block diagram illustrating one embodiment of memory locations in which image data may be stored to form a rendered sheet comprising an N-up grid of the images.

FIG. 4B is a diagram illustrating one embodiment of memory locations 445a-d within a buffer 447 for a rendered page having image data formatted into an N-up grid 437. In particular, FIG. 4B depicts memory locations 445a-d corresponding to image data that was used to generate the output 435 shown in FIG. 4A.

Rectangular regions 445 illustrated in FIG. 4B represent specific memory locations 445, or blocks of memory, in which image data for a particular image may be stored. Image data for the first image 443a is stored in a first memory location 445a, image data for the second image 443b is stored in the second memory location 445b, and so forth for each image 443 within the pertinent N-up grid 437. The size of each memory location 445 will depend on the size of the image data for each image.

Figure 5:
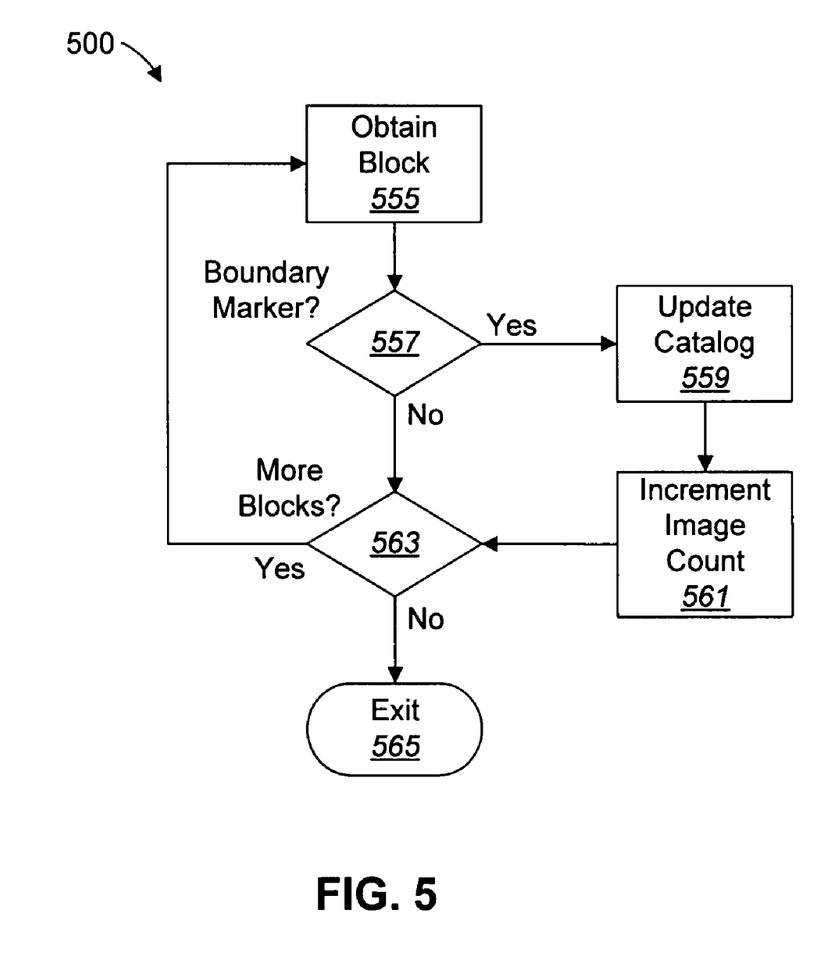
FIG. 5 is a flow diagram illustrating one embodiment of a method for identifying image boundaries and cataloging images within image data.

FIG. 5 is a flow diagram illustrating one embodiment of a method 500 for identifying image boundaries and cataloging images within streaming image data 105. As indicated above, when streaming image data 105 is received at the imaging device 101, identifying boundaries between the images may be used to identify image data for each image. A block of data from the streaming image data 105 is first obtained 555. It is then determined 557 whether the block of data is an image boundary marker (e.g., a marker designating the end or beginning of an image). If it is an image boundary marker, a catalog to identify images is updated 559. The image count 561 is then incremented.

If the currently examined block is not an image boundary marker, it is determined 563 whether there are more blocks of data to be analyzed within the streaming image data. If there are no further blocks, the process 500 is terminated 565. If there are additional blocks to be analyzed, the procedure 500 is repeated to identify additional image boundaries. In one embodiment, image data for the cataloged images can be stored in one or more buffers or memory locations until further processing or transformation.

The foregoing procedure 500 may be implemented in connection with any image format that includes image boundary markers embedded within streaming image data 105. Such an image file format may include, for example, the joint photographic experts group (JPEG) file format.

Figure 6:
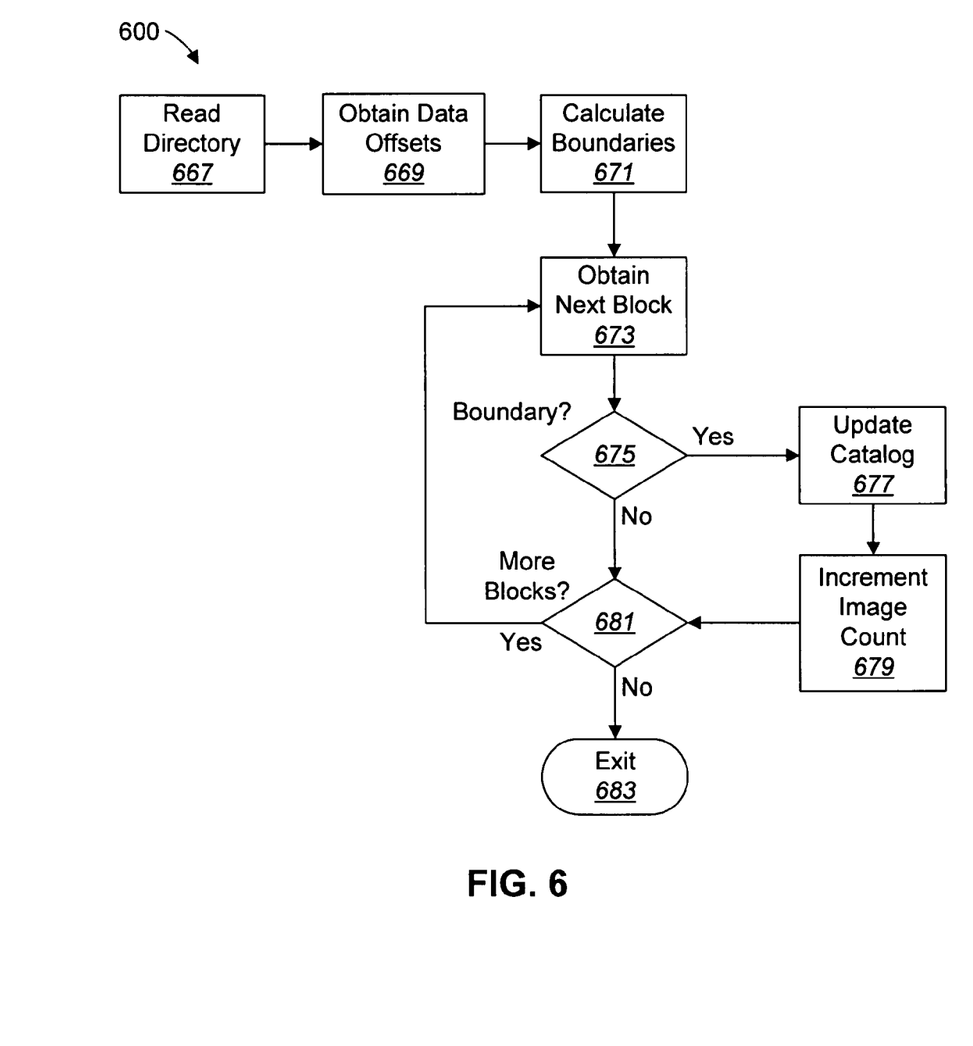
FIG. 6 is a flow diagram illustrating an alternative embodiment of a method for identifying image boundaries and cataloging images within image data.

FIG. 6 is a flow diagram illustrating an alternative embodiment of a method 600 for identifying image boundaries and cataloging images within streaming image data 105. In this embodiment, the streaming image data includes a directory. The directory includes offsets, which may be used to compute image boundaries. The tagged image file format (TIFF) and potentially other image file formats employ such a directory system, with which the disclosed method 600 may be used.

The procedure 600 is initiated by reading 667 the directory found in the streaming image data 105. The offset or offsets are obtained 669 from the directory. Thereafter, an image boundary or boundaries are calculated 671 based on the offsets.

The next block of data from the streaming image data is then obtained 673. It is then determined 675 whether the block of data is one of the calculated boundaries. If it is one of the boundaries, a catalog used to identify/track images is updated 677. The image count 679 is then incremented. In one embodiment, image data for the cataloged images can be stored in one or more buffers or memory locations until further processing or transformation.

Following these procedures 677, 679 or if the block is determined 675 not to be a boundary, it is determined 681 whether there are more blocks of data to be analyzed. If there are no further blocks, the algorithm 600 is terminated 683. If there are additional blocks to be analyzed, the examination procedure is repeated to locate additional image boundaries.

Figure 7:
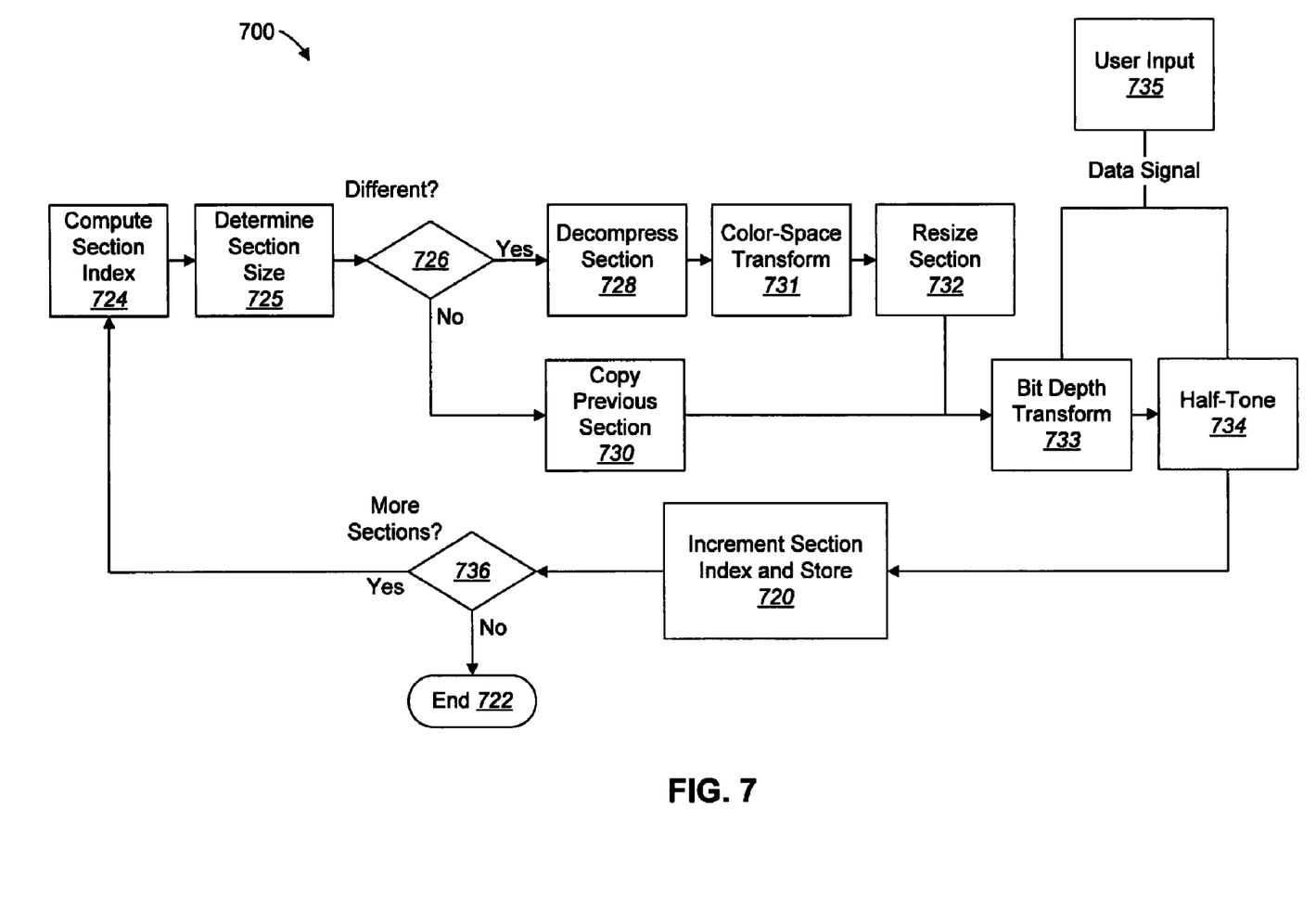
FIG. 7 is a flow diagram illustrating one embodiment of a method for transforming image data.

FIG. 7 is a flow diagram illustrating one embodiment of a method 700 for transforming the image data, which was briefly explained in connection with the transform block 127 of FIG. 1. In the illustrated embodiment, the image data may be transformed on a section-by-section basis. In one embodiment, the sections are rows or groups of rows within the image data.

Following receipt of image data, the section index is computed 724. It is then determined 725 what the size of the next section should be. The size of the section indicates the number of scan lines or regions to be processed in a single pass by the disclosed method 700. The size of the section may be determined by reference to the image format of the image data.

It is then determined 726 whether the new section is different from the previous section. If the new section is different, the new section is then decompressed 728, if the data is in a compressed format.

Thereafter, a color-space transformation 731 may be performed on the decompressed 728 section. The color-space transform 731 may, in one embodiment, be based on the parameters of the input image of one color-space (e.g., RGB color, gray scale of a specific number of bits per pixel, or black and white) and a specified output device (e.g., a printer) of another color-space (e.g., CMYK color, gray scale of a specific number of bits per pixel, or black and white). For example, if the output device is a printer that is only capable of printing in black-and-white, the color-space transform 731 process may convert a section, and ultimately all, of an input color or image into a black-and-white format. The transformation 731 may also involve converting a gray-scale image to a black-and-white image or a gray-scale image having a fewer number of bits per pixel. The transformation 731 may, in one embodiment, change the image data from an RGB (read green blue) format to a CMYK (cyan magnetic yellow black) format, which is commonly used by color printers. This transformation 731 could also involve bit depth transformation or other parameters that control how an image appears when printed or viewed following processing.

Thereafter, the section is resized 732, if appropriate or requested by a user. As indicated above, resizing of the image data may be appropriate when, for example, N-up formatting is active.

If the new section is not different from the previous section, the previous section is copied 730 from a temporary storage location (e.g., volatile or non-volatile memory). In one embodiment, the stored version of the previous section has already been decompressed 728, color-space transformed 731, and/or resized 732. Accordingly, either one or all of these steps 728, 731, 732 may be skipped with respect to processing the previously stored section.

Thereafter, the section may optionally be transformed relative to bit depth 733 and half-toning method 734. In one embodiment, the bit depth 733 and half-toning method 734 are specified by a data signal generated in response to user input 735 (via, for example, a touchpad, or button). Alternatively, the bit depth 733 and half-toning method 734 may be specified using other techniques, such as by reference to an identified or default output device.

Following these processes, the section index is incremented and the processed section is stored 720. It is then determined 736 whether the digital image contains additional sections to be processed. If there are no additional sections to be processed, the procedure is terminated 722. If there are additional sections, the process is repeated for each subsequently identified section of the specified digital image. When all sections have been processed, the processed sections are then combined (or have been combined through saving the stored images in consecutive or specific memory locations) to produce an entire digital image in an image-ready format. Within the scope of the disclosed systems and methods, various steps of transforming the image data may be omitted or performed in a different order. For example, the decompressing or resizing procedures 728, 732 may be omitted if image data is not compressed or does not need to be resized. In one embodiment, the image data is of a proper color-space and thus the color-space transform 731 is a "null" transform.

Figure 8:
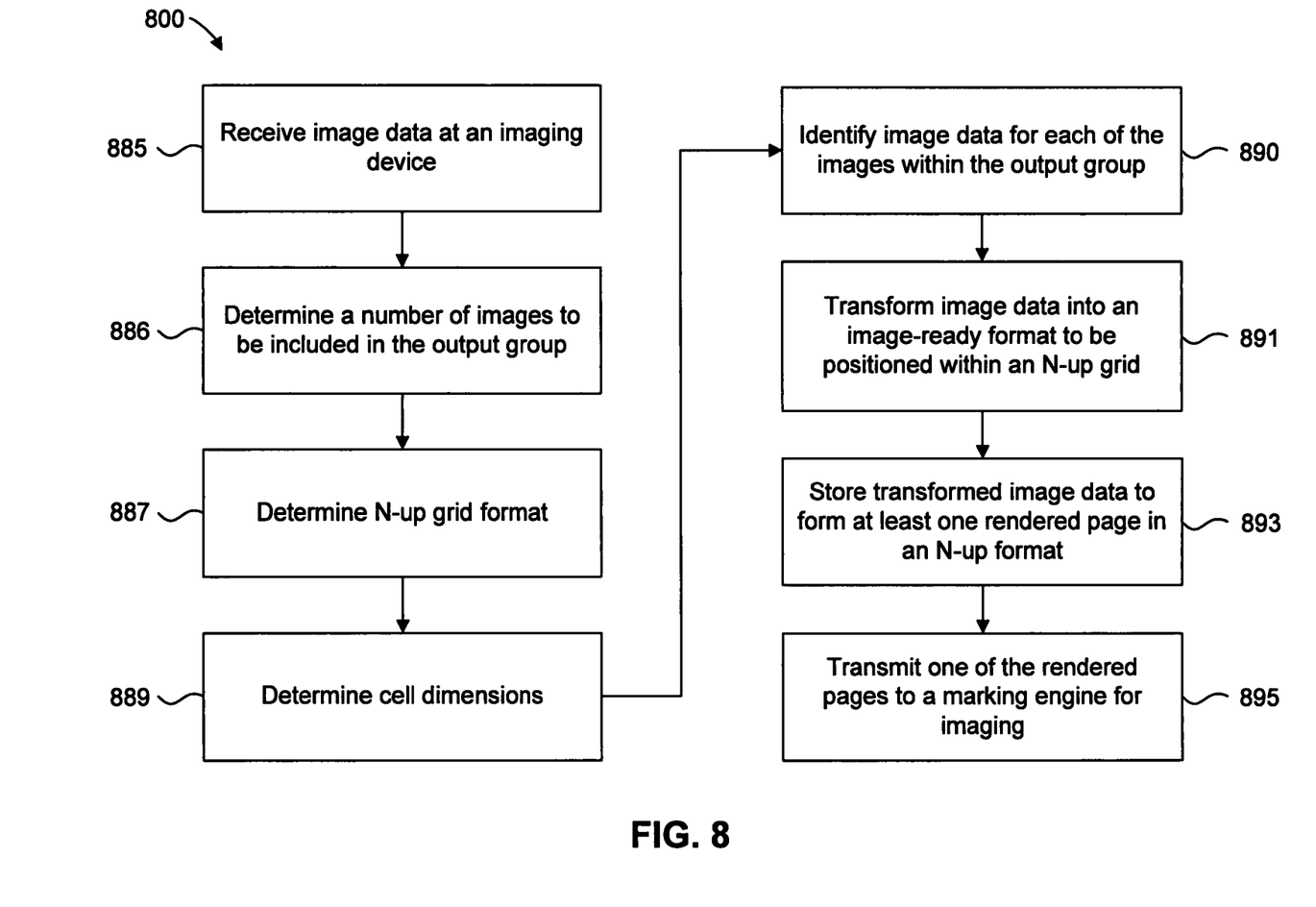
FIG. 8 is a flow diagram illustrating one embodiment of a method for imaging image data comprising multiple images in an N-up and/or duplexed format in a driverless environment.

FIG. 8 is a flow diagram illustrating one embodiment of a method 800 for imaging image data 105 comprising multiple images in an N-up and/or duplexed format in a driverless environment. Image data is received 885 at an imaging device. The image data may be embodied in various formats, such as a multi-page file where each page in the file comprises a separate image or a series of concatenated or non-concatenated image files.

The number of images to be included in the output group is then determined 886. As indicated in FIG. 3, in one embodiment, such a determination may be made based on duplexing and/or N-up settings.

Concurrent with or following this determination 886, the N-up grid format is determined 887. In one embodiment, the number of rows and columns within the grid are determined. Of course, various types of grids, such as grids of shapes other than rectangular, could be used within the scope of this invention.

The dimensions of each cell within the grid are also determined 889. This determination is based, for example, on the format of the grid and the dimensions of the target imaging medium.

Thereafter, image data corresponding to each image within the output group is identified 890. Each image, in one embodiment, is a separate page within a multi-page image file that is being streamed to the imaging device 101 or may simply be a separate file. As explained above, image boundaries and images may be identified 890 in various ways, such as by locating image boundary markers or calculating offsets from a directory.

After the image boundaries have been identified 890, the image data for each of the images within the output group is transformed 891 into an image-ready format to be imaged within an N-up grid. Image data in an image-ready format may be directly processed by the marking engine 117. Again, transformation 891 of the image data may involve, for example, decompressing, color-space transforming, resizing, bit depth transformation, and half-toning. Various steps of the transformation process may be omitted or performed in a different order within the scope of the disclosed systems and methods. The transformation may be performed, for example, on a section-by-section basis, on an entire image, or on a section of the image data greater than an image.

Thereafter, transformed image data (for each of the images within the output group) is stored 893 in a buffer at a memory location corresponding to a cell within the N-up grid to form at least one rendered page. The buffer may be embodied as various types of memory.

When all the streaming data for the images within the output group are stored in the buffer, at least one rendered page having image data formatted in an N-up grid is transmitted 895 to a marking engine 117 for imaging. If the duplexing settings are active, multiple rendered pages may be transmitted to the marking engine for duplexed processing. Again, images may be placed in an N-up grid without the need for a separate computing device to format the data in an N-up grid and transmit data to the imaging device.

Figure 9:
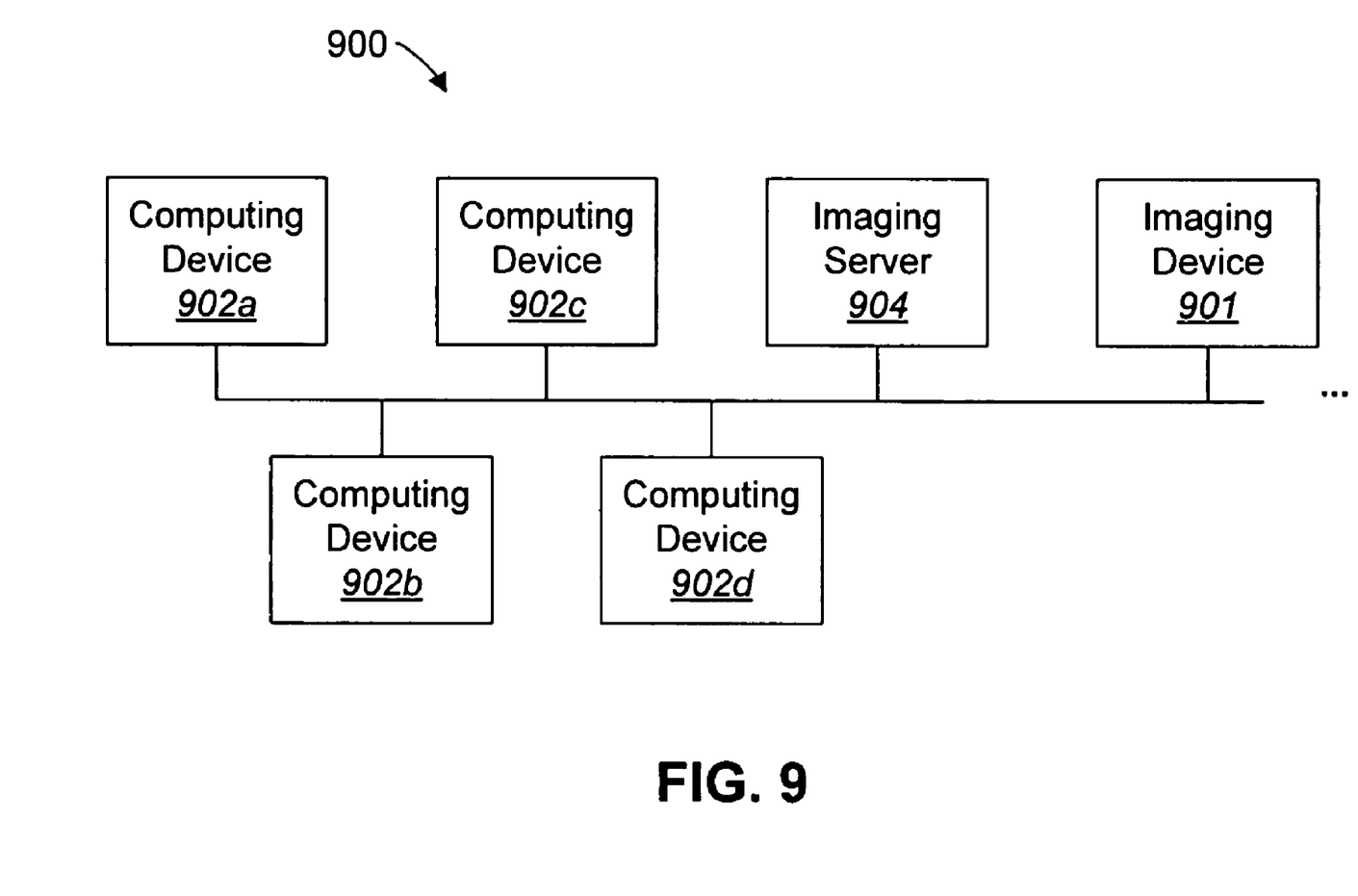
FIG. 9 is a network block diagram illustrating one possible environment in which the present imaging systems and methods may be implemented.

FIG. 9 is a network block diagram illustrating one possible environment 900 in which the present systems and methods may be implemented. In particular, FIG. 9 illustrates a computer network 900 comprising a plurality of computing devices 902, an imaging server 904, and an imaging device 901. Of course, the imaging device 901 disclosed herein is not necessarily implemented in a network environment but may be used, for example, by a direct parallel, serial, wireless, or USB connection to a computing device 902.

In the illustrated environment, image data 105 may be generated by any one of the computing devices 902 and may be transmitted directly to the imaging device 901. Alternatively, the computing device 902, or client 902, may transmit image data to the imaging server 904 for processing or temporary storage before the image data is forwarded and streamed to the imaging device 901.

The computing device 902 may be embodied in a wide variety of different ways. For example, the computing device 902 may be a desktop computer, a personal data assistant (PDA), a tablet PC, a notebook computer, a cellular telephone, or any other type of computing device that is capable of transmitting image data.

Embodiments of the disclosed systems and methods may process image data 105 of various types and in various formats. In one embodiment, no imaging driver is required to process image data before it is received by the imaging device 901. For example, the imaging device 901 may directly process image data in a JPEG, a TIFF, or a portable network graphics (PNG) format.

Imaging devices 901 disclosed herein may include software, firmware, hardware and other forms that achieve the function described herein. The embodiments may be adapted to many environments with varying computing devices 902, operating systems, printing devices, network hardware and software, applications and other variables.

The embodiments disclosed operate independently of how transmission of the image data is initiated. For example, an imaging job may be initiated by an application using a computing device 902 or may be initiated from the imaging device 901 itself, such as by connecting a portable storage device having stored images to the imaging device 901.

The term "network" 900 may refer to any combination of computing devices 902 and peripherals, such as imaging devices 901, wherein the devices can communicate with each other. The term "network" 900 may comprise local area networks (LANs), storage area networks (SANs), metropolitan area networks (MANs), wide area networks (WANs), and combinations thereof (e.g. the Internet) with no requirement that the client 902, imaging device 901, and server 904 reside in the same physical location, the same network 900 segment, or even in the same physical network 900. A network 900 may be internally interconnected or connected with other networks using conventional conductive cable, fiber-optic cable, phone line cable, power line cable or other electrical and light conductors and other signal transmission media as well as wireless connections using infrared, RF or other wireless methods, or combinations of the foregoing.

Figure 10:
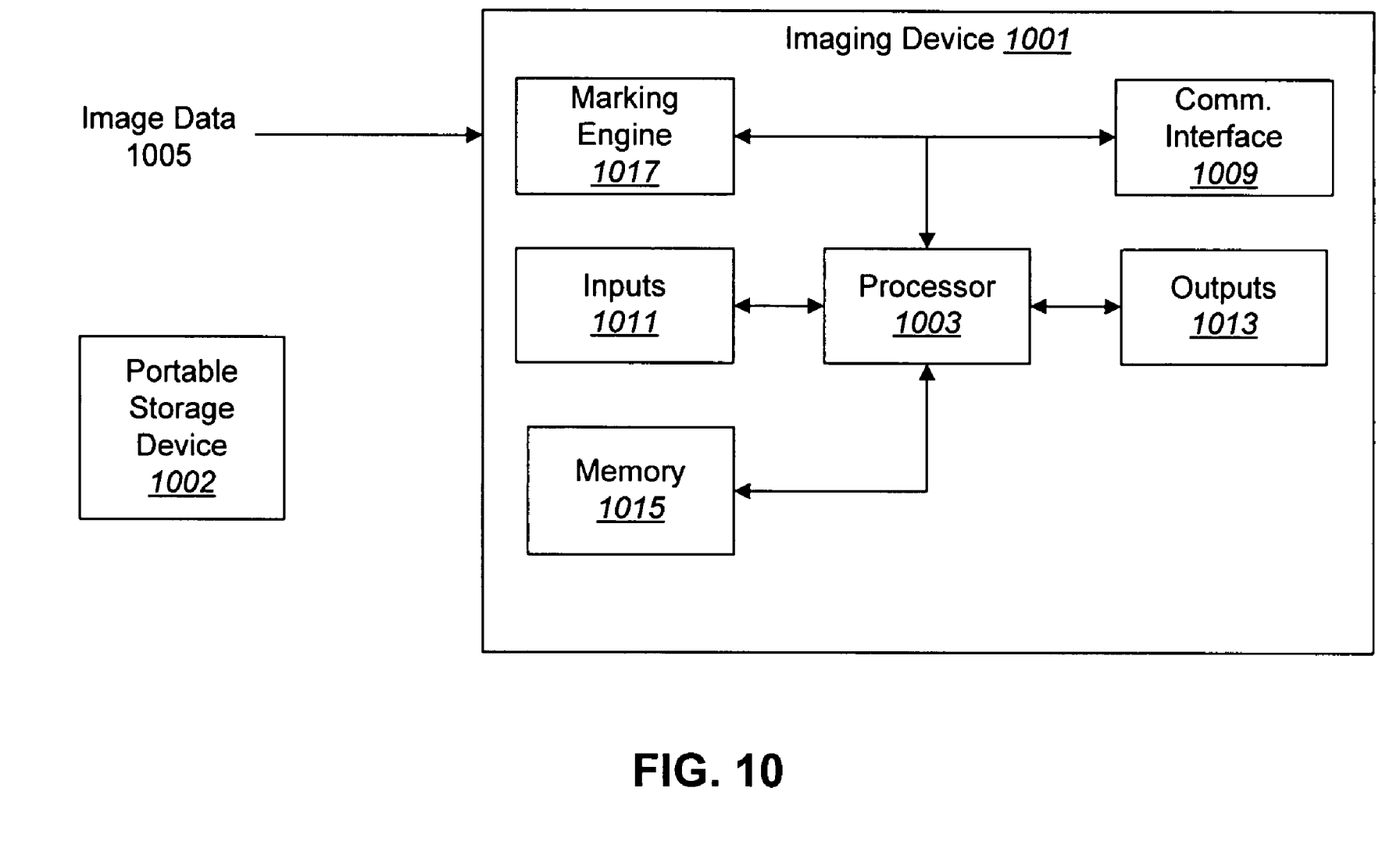
FIG. 10 is a block diagram illustrating the major hardware components typically utilized with embodiments of an imaging device, together with a portable storage device that may be used to provide image data to the imaging device.

FIG. 10 is a block diagram illustrating the major hardware components typically utilized with embodiments of an imaging device 1001, together with a portable storage device 1002 that may be used to provide image to the imaging device 1001. As noted above, an imaging device 1001 receives image data 1005 comprising multiple images and generates imaged output in an N-up format. As indicated above, imaging devices 1001 include, but are not limited to, a multi-function peripheral ("MFP") (e.g., a printer/copier/scanner or printer/copier/fax machine), a printer, a copier, a fax machine, a plotter, a computer monitor, an electronic whiteboard, etc. The imaging device 1001 may be a single or a plural grouping (e.g., pool or cluster) of two or more devices.

An imaging device 1001 typically includes a processor 1003 in electronic communication with various components of the imaging device 1001. The processor 1003 controls the operation of the imaging device 1001 and may be embodied as a microprocessor, a microcontroller, a digital signal processor (DSP) or other device known in the art. The processor 1003 typically performs logical and arithmetic operations based on program instructions stored within the memory 1015.

The imaging device 1001 may also include a marking engine 1017 in communication with the processor 1003. The marking engine 1017 comprises the systems and components for creating an image based on received or processed image data. For example, if the imaging device is a printer (e.g., an inkjet, thermal dye sublimation, or laser printer) or a fax machine, the marking engine 1017 comprises those components used to mark paper with the image specified by the image data. If the imaging device 1001 is a display device, the marking engine 1017 comprises those components used to display the image on the screen, in contrast to those components used to process the data received by the display device.

The processor 1003 may also be in electronic communication with a communication interface 1009. The communication interface 1009 may be used for communications with computing devices, servers, other imaging devices, storage devices, etc. Thus, the communication interface 1009 of the device 1001 may be designed to send or receive signals from other devices (e.g., a computing device 902 shown in FIG. 9). The communication interface 1009 may be based on wired communication technology, wireless communication technology, or both. Examples of different types of communication interfaces 1009 include a serial port, a parallel port, USB, an Ethernet adapter, an IEEE 1394 bus interface, a small computer system (SCSI) bus interface, an infrared (IrDA) communication port, a Bluetooth wireless communication adapter, and so forth. In one embodiment, a portable storage device 1002, a thumb drive, compact flash (CF) card, compact disk, digital video disk (DVD), or portable hard drive) may use the communication interface 1009 to provide image data stored on the portable storage device 1002 to the imaging device 1001

The processor 1003 may operably be connected to various input 1011 and/or output 1013 devices capable of electronic communication with the processor 1003, or, in other words, with devices capable of input and/or output in the form of an electrical signal. Embodiments of imaging devices 1001 may include the inputs 1011, outputs 1013, and processor 1003 within the same physical structure or in separate housings or structures. Examples of different kinds of input devices 1011 include a keypad, keyboard, mouse, microphone, remote control device, button, joystick, trackball, touchpad, touch screen, lightpen, etc. Examples of different kinds of output devices 1013 include an LCD screen (for displaying the status or selected features of the imaging device 1001) and a speaker.

In one embodiment, the input device 1011 (such as a touch screen or button) may be used to alter duplexing or N-up settings for the imaging device 1001. An output device 1013 (such as an LCD screen) could be used to indicate current duplexing or N-up settings or the procedures for altering those settings.

The imaging device 1001 may also include memory 1015. The memory 1015 may be a separate component from the processor 1003, or it may be on-board memory 1015 integrated with the processor 1003. For example, microcontrollers often include a certain amount of on-board memory. As used herein, the term "memory" 1015 is broadly defined as any electronic storage medium, such as read-only memory (ROM), random access memory (RAM), magnetic disk storage media, optical storage media, flash memory devices, on-board memory included with the processor 1003, EPROM memory, EEPROM memory, registers, etc. The memory 1015 typically stores program instructions and other types of data. The program instructions may be executed by the processor 1003 to implement some or all of the methods disclosed herein. The memory 1015 may also be used as a queue (e.g., 109 of FIG. 1) or buffer in which to store image data received by the imaging device 1001.

In one embodiment, the imaging device 1001 is an embedded device. An embedded device stores much, if not all, of its programming code in read-only memory. An embedded device is not a general purpose computer, but generally performs a specific purpose, such as imaging.

In addition, in one embodiment, the disclosed imaging device 1001 is a driverless imaging device 1001. In other words, image data 1005 does not need to be processed by a driver before processing (receiving, transforming, imaging, etc.) by the imaging device 1001 to create an image.

Aspects of the systems and methods disclosed herein may be performed, for example, in accordance with the psuedocode shown below. For example, the following pseudo code describes one embodiment of driverless N-up imaging:

```
Print Function
    // Initialize counters
    page_offset   = 0;
    shutdown      = FALSE;
    n-up_count    = 0;    // Current n-up count
    image_number  = 0;    // Current image
    // Duplex pages for n-up
    if (duplex is back page first)
        read_pages  = 2 * n-up_number;
    else if (format is not streamable)
        read_pages  = All Available;
    else
        read_pages  = 1;
    end if
    // Top level Online do loop. Keep running as long as IO channel is
    // active, and there are pages to process
    do
```

```
        // Stream (read_pages) number of images into the in-situ
        file system
        // Ask for read_pages, actual is input_pages
        Read Images;
        // Now that we have images to process, compute the quantity to
        // process. Also, check if the input task has exited
        if (input is active)
            // Truncate new pages to a multiple of read_pages
            new_pages = read_pages*(input_pages/read_pages);
            // Decrement input_pages by the new pages that
            will be processed
            input_pages = input_pages - new_pages;
        else   // Process all remaining pages and shutdown
            new_pages = input_pages;
            input_pages = 0;
            shutdown = TRUE;
        end if
        // Set start and stop indices. If duplex is LPF, and input has
        // stopped, round up read_pages (for blank page insertion)
        start_index = 0;
        if (duplex is back page first && shutdown)
            stop_index = read_pages*((new_pages + read_pages - 1) /
        read_pages);
        else
            stop_index = new_pages;
        end if
        // Page processing loop
        for (start_index to stop_index; )
            if (duplex is back page first) // Do the count for duplex
                page_number = Duplex Page Index;
            else   // Just count up regular like
                page_number = page_offset + page index;
            end if
            // Only process a valid page. Duplex blank page
            // will skip this block
            if (page_number < new_pages + page_offset)
                Transform Image;    // Decode Resize Halftone, etc.
            end if
            // Print when n-up number of images have been processed
            if ((increment n-up_count) == n-up_number)
                Print Page;
                n-up_count = 0;
            end if
        end for
        // Increment page offset
        page_offset = page-offset + new_pages;
    // Keep running while input is active or there are input_pages
    to process
    while (!shutdown || input_pages > 0 ) ;
    // Flush the page, if it hasn't been printed. This happens when
    // count < n, but all pages have been processed
    if (n-up_count > 0)
        Print Page;
        n-up_count = 0;
    end if
End Print Function
```

The following pseudo code describes one embodiment of aspects of the transforming functions briefly outlined in connection with FIG. 7.

```
Process Image Section
    e = 0;
    while (number of scan lines >= 0)
        if (source_line == previous_line)
            Halftone previous_line
        else
            Color Transform source_line // Apply the color transform
            Resize source_line // Resize scan line
            Halftone source_line// apply the halftone function
            Previous_line = source_line
        end if
        target_index++;
        source_line += ⌊source_height/target_height⌋
        e += modulo [source_height/target_height]
```

```
-continued if (e >= target_height)
    e -= target_height
    source_index++;
end if
end while
End Process Image Section
```

The foregoing excerpt of pseudo code are intended only to serve as sample embodiments of the disclosed invention and are not limiting of the scope and extent of the disclosed systems and methods.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for creating an image in an N-up format in a driverless environment, comprising:
    establishing electronic communication with a portable storage device that comprises image data, wherein the image data comprises multiple images, wherein the portable storage device lacks image processing capability;
    receiving the image data at an embedded imaging device, wherein the image data has not been transformed into an N-up grid by an imaging driver;
    determining a number of images to be included in an output group, the output group comprising image data for the number of images to be stored before imaging is initiated;
    identifying image data for each of the images within the output group;
    transforming image data for each of the images within the output group into an image-ready format to be imaged within an N-up grid, wherein the format for the N-up grid is determined by the embedded imaging device without the embedded imaging device being in electronic communication with another device having processing capability;
    storing the transformed image data for each of the images within the output group in a buffer at a memory location corresponding to a cell within the N-up grid to form at least one rendered page; and
    transmitting one of the rendered pages having image data formatted in an N-up grid to a marking engine for imaging, wherein the image data has not been processed by a driver before the one of the rendered pages is transmitted to the marking engine.

2. The method of claim 1, wherein the image data does not need to be processed by a driver before processing by the embedded imaging device.

3. The method of claim 1, wherein the output group comprises N images, wherein N is the number of images to be included within the N-up grid.

4. The method of claim 1, wherein there is no restriction on the size of N.

5. The method of claim 1, further comprising determining dimensions of each cell based on the format of the N-up grid and dimensions of the target imaging medium.

6. The method of claim 1, wherein the number of images within the output group is controlled by N-up and duplexing settings for the embedded imaging device.

7. The method of claim 1, wherein the embedded imaging device is capable of producing duplexed output, and wherein transmitting comprises transmitting at least a first and second rendered page in an N-up format for duplexed imaging of the first and second rendered pages by the marking engine.

8. The method of claim 7, wherein the duplex mode is set to back-page-first.

9. The method of claim 8, wherein the number of images within the output group is 2N, wherein N is the number of images to be included within the N-up grid on one side of an imaging medium.

10. An embedded imaging device for creating an image in an N-up format in a driverless environment, the embedded imaging device comprising:
- a processor;
- memory in electronic communication with the processor;
- a marking engine in electronic communication with the processor;
- instructions stored in the memory, the instructions being executable to:
  - establish electronic communication with a portable storage device that comprises image data, wherein the image data comprises multiple images, wherein the portable storage device lacks image processing capability;
  - receive image data, wherein the image data has not been transformed into an N-up grid by an imaging driver;
  - determine a number of images to be included in an output group, the output group comprising image data for the number of images to be stored before imaging is initiated;
  - identify image data for each of the images within the output group;
  - transform image data for each of the images within the output group into an image-ready format to be imaged within an N-up grid, wherein the format for the N-up grid is determined by the embedded imaging device without the embedded imaging device being in electronic communication with another device having processing capability;
  - store the transformed image data for each of the images within the output group in a buffer at a memory location corresponding to a cell within the N-up grid to form at least one rendered page; and
  - transmit one of the rendered pages having image data formatted in an N-up grid to the marking engine for imaging, wherein the image data has not been processed by a driver before the one of the rendered pages is transmitted to the marking engine.

11. The embedded imaging device of claim 10, wherein the streaming image data does not need to be processed by a driver before processing by the embedded imaging device.

12. The embedded imaging device of claim 10, wherein there is no restriction on the size of N.

13. The embedded imaging device of claim 10, wherein the number of images within the output group is controlled by N-up and duplexing settings for the embedded imaging device.

14. The embedded imaging device of claim 10, wherein the embedded imaging device is capable of producing duplexed output, and wherein transmitting comprises transmitting at least a first and second rendered page in an N-up format for duplexed imaging of the first and second rendered pages by the marking engine.

15. An embedded printing device for printing in an N-up format in a driverless environment, the printing device comprising:
- a processor;
- memory in electronic communication with the processor;
- a marking engine in electronic communication with the processor;
- instructions stored in the memory, the instructions being executable to:
  - establish electronic communication with a portable storage device that comprises image data, wherein the image data comprises multiple images, wherein the portable storage device lacks image processing capability;
  - receive image data, wherein the image data has not been transformed into an N-up grid by an imaging driver;
  - determine a number of images to be included in an output group, the output group comprising image data for the number of images to be stored before imaging is initiated;
  - identify image data for each of the images within the output group;
  - transform image data for each of the images within the output group into an image-ready format to be imaged within an N-up grid, wherein the format for the N-up grid is determined by the embedded imaging device without the embedded imaging device being in electronic communication with another device having processing capability;
  - store the transformed image data for each of the images within the output group in a buffer at a memory location corresponding to a cell within the N-up grid to form at least one rendered page; and
  - transmit one of the rendered pages having image data formatted in an N-up grid to the marking engine for printing, wherein the image data has not been processed by a driver before the one of the rendered pages is transmitted to the marking engine.

16. The printing device of claim 15, wherein the streaming image data does not need to be processed by a driver before processing by the embedded printing device.

17. The printing device of claim 15, wherein the number of images within the output group is controlled by N-up and duplexing settings for the embedded imaging device.

18. The printing device of claim 15, wherein the embedded imaging device is capable of producing duplexed output, and wherein transmitting comprises transmitting at least a first and second rendered page in an N-up format for duplexed printing of the first and second rendered pages by the marking engine.

* * * * *